(No Model.)
C. O. VOLZ.
PROCESS OF MAKING NITRIC ACID.
No. 500,786. Patented July 4, 1893.
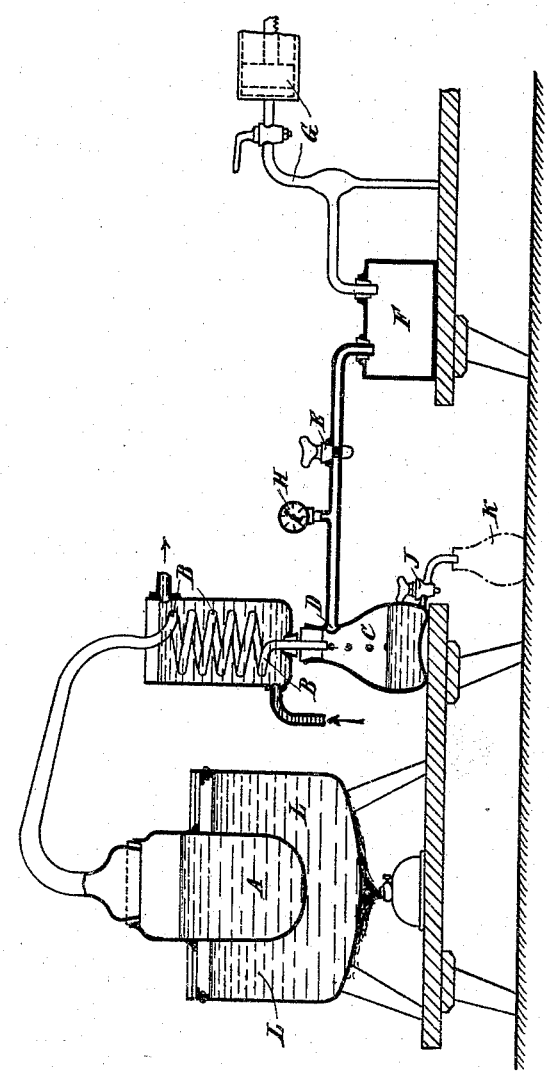
Attest:
Mattern Donaldson
F. L. Middleton
Inventor
C. O. Volz
by Richards & Co.
Attys

UNITED STATES PATENT OFFICE.

CARL OTTO VOLZ, OF BERLIN, GERMANY.

PROCESS OF MAKING NITRIC ACID.

SPECIFICATION forming part of Letters Patent No. 500,786, dated July 4, 1893.

Application filed April 8, 1892. Serial No. 428,380. (No specimens.)

*To all whom it may concern:*

Be it known that I, CARL OTTO VOLZ, doctor of philosophy, a subject of the Emperor of Germany, residing at Berlin, in the Empire of Germany, have invented a certain new and useful Process of Making Nitric Acid, of which the following is a specification.

The great progress made in a great number of industrial branches and principally in the manufacture of explosives, has had the effect to increase largely from year to year the consumption of nitric acid. For the purpose of obtaining a very pure acid and as concentrated as possible—which yields the most during the nitration—several new processes have been suggested in the manufacture of nitric acid, which however, are more or less complicated and in which the acid has to be submitted to further operations in order to make it purer, so that the cost price is so high that it is necessary to abstain from the general use of the acid. In the processes referred to the nitric acid is produced by the distillation of sulphuric acid with saltpeter, the decomposition of the saltpeter being obtained by intense heating. Under these circumstances are obtained products of distillation different as to the degree of concentration and purity. Those fractions are then separated and they are brought by further operations to the degree required for the manufacturing of nitrated products.

The present process consists in causing the decomposition of the pure raw materials in a vacuum and the result is anhydrous and very pure nitric acid (in which only traces of peroxide of nitrogen are formed) by one operation only. The different manipulations required in the old processes for the progressive concentration are avoided by this system and also the formation of but little oxygenated nitrogen combinations. In fact with the old processes it was necessary to cause the decomposition of the saltpeter in presence of sulphuric acid by a very high temperature the action of which resulted in the partial decomposition of the formed nitric acid and in the formation of hyponitric products. Moreover, by working in a retort containing air, the vapors will of course need a certain time to evacuate and other vapors will already have been formed while the former remain in contact with the heated walls of the retort, the result of which will be an overheating of vapors which will also cause a partial decomposition of the nitric acid. If we work in a vacuum the result will be entirely different and as such a high temperature is not required the partial decomposition of the nitric acid already formed will not take place and consequently the hyponitric products will not exist; moreover in a retort wherein a vacuum has been produced, the escaping vapors will be evacuated immediately and will make room constantly for the other succeeding vapors without having had the time to remain long enough to be overheated, which overheating causes hyponitric products. The vacuum having been established in the successive apparatus, the decomposition of the saltpeter and of the sulphuric acid, the condensation of the vapors, and the collecting of the nitric acid happen in a relatively short time while avoiding all injurious nitrogen combinations so that by one operation only we obtain immediately a chemically pure nitric acid clear and anhydrous, the analysis of which shows 99.78 per cent $N.O_3H$, a percentage which has never been obtained yet, while there remains only a residue of bisulphate of soda.

In order to make my process better understood I will describe it taking as an instance details of the annexed drawing in which I show a vertical section of an apparatus for carrying out my process.

The retort A, is connected air tight with the refrigerator or condenser B, which is hermetically connected with the receiver C. The latter is provided laterally with a tube D, which is hermetically connected with a Woulff bottle F. A three way cock E, is interposed in this connection. The Woulff bottle is connected with an air pump G. On the tube D, is a steam gage H. After having put pure raw material into the retort (I mean refined saltpeter and sulphuric acid at 66° Baumé) the vacuum is established in the described apparatus by means of the pump G. The decomposition of the saltpeter then takes place under the conditions mentioned above without causing any hyponitric products. The vacuum enables the decomposition to be produced entirely without the aid of heat but by putting the retort A, into a water bath L, which it is sufficient to bring to a temperature of 85° Celsius, it adds a great deal to the rapidity of the operating, while the heat is not strong enough to cause the injurious effects of the old process, namely, to produce a partial decomposition of the escaping vapors of nitric acid. These, as soon as formed, without having the time to remain in injurious contact with the heated walls of the retort, pass into the refrigerator B, making room constantly for new vapors which are formed. The vapors are condensed in the refrigerator and the nitric acid which is formed is gathered in the collecting receptacle C. The Woulff bottle or bottles F, are preferably half filled with a lye of soda so as to make inoffensive the last remnant of acid vapors which may be carried along without being sufficiently condensed as this could happen if there was a very strong development and a weak refrigeration.

By means of the cock J, the acid can be drawn from the receiver into the flask K, or into any other receptacle for the purpose of carrying it away. The acid thus obtained by one operation is clear and chemically pure. It is perfectly free from hyponitric acid and of nitrous acid, of chlorine and of water; in the air it evolves white fumes and has a specific gravity of 1.53 at 15° centigrade.

The essays of nitration made with the acid obtained in this way and by this process have given very favorable results. The nitrated products are much purer and clearer than the product of the nitration by other nitric acids; the nitrated cellulose (gun cotton) obtained with this acid keeps its white color.

If it is not desired to obtain such a pure acid still this process can be used to great advantage, considering the great saving of time and fuel, with less pure raw material, as for instance nitrate of soda and common sulphuric acid. However, when the distillation of these materials is made it will be necessary to change the receiver a short time after the beginning of the operation as the slightly oxygenated products of the nitric acid as well as the halogens are to be found in the first vapors. The loss is very small. The acid which will be gathered afterward will be good for a great many purposes.

I claim—

1. The herein described process for production of pure and very concentrated nitric acid consisting in placing the raw materials, such as saltpeter and sulphuric acid in an air tight receptacle, establishing a vacuum during the decomposition and condensing the vapor generated, substantially as described.

2. The herein described process for the production of pure nitric acid consisting in placing the raw material, such as saltpeter and sulphuric acid in a retort, heating the same to 85° Celsius, exhausting the air and condensing the generated vapors, substantially as described.

In testimony whereof I have signed this specification in the presence of two subscribing witnesses.

CARL OTTO VOLZ.

Witnesses:
GUSTAV QUILIBY,
TH. IDUNAUSER.